US009712107B2

(12) United States Patent
Tung

(10) Patent No.: US 9,712,107 B2
(45) Date of Patent: Jul. 18, 2017

(54) MODULAR SUPPORT ASSEMBLY FOR A SOLAR POWER SYSTEM

(71) Applicant: SUN RISE E & T CORPORATION, Pingtung, Pingtung County (TW)

(72) Inventor: Chi-Hsu Tung, Pingtung (TW)

(73) Assignee: SUN RISE E & T CORPORATION, Pingtung, Pingtung County (TW)

( * ) Notice: Subject to any disclaimer, the term of this patent is extended or adjusted under 35 U.S.C. 154(b) by 0 days.

(21) Appl. No.: 15/167,302

(22) Filed: May 27, 2016

(65) Prior Publication Data

US 2016/0352284 A1    Dec. 1, 2016

(30) Foreign Application Priority Data

May 28, 2015   (TW) .............................. 104208348 U

(51) Int. Cl.
| H02N 6/00 | (2006.01) |
| H02S 20/30 | (2014.01) |
| F24J 2/52 | (2006.01) |
| H02S 30/10 | (2014.01) |
| B63B 35/44 | (2006.01) |
| F24J 2/46 | (2006.01) |

(52) U.S. Cl.
CPC ............... *H02S 20/30* (2014.12); *F24J 2/526* (2013.01); *F24J 2/5267* (2013.01); *H02S 30/10* (2014.12); *B63B 2035/4453* (2013.01); *F24J 2002/4667* (2013.01); *Y02E 10/47* (2013.01)

(58) Field of Classification Search
CPC F24J 2/52; H01L 31/042; H02S 20/30; H02S 30/10; Y02E 10/47; B63B 2035/4453
USPC .......................... 248/634, 635, 694; 136/246; 210/170.02, 170.05, 242.2; 261/30, 120
See application file for complete search history.

(56) References Cited

U.S. PATENT DOCUMENTS

| 3,635,181 A | 1/1972 | Epple et al. |
| 4,906,359 A * | 3/1990 | Cox, Jr. ................ B01F 3/0412 |
| | | 210/170.02 |

(Continued)

FOREIGN PATENT DOCUMENTS

| CN | 202120929 U | 1/2012 |
| CN | 103334869 A | 10/2013 |

(Continued)

OTHER PUBLICATIONS

Search Report completed Oct. 20, 2016 in corresponding European Patent Application No. 15170551.

*Primary Examiner* — Gwendolyn Baxter
(74) *Attorney, Agent, or Firm* — Muncy, Geissler, Olds & Lowe, P.C.

(57) ABSTRACT

A modular support assembly for a solar power system includes a plurality of base units each of which includes a base frame having first and second tube members, and a plurality of connection units each of which interconnects two adjacent ones of the base units. Each connection unit includes two sleeve members and a plurality of fasteners. Each sleeve member has a tubular portion sleeved on one end of the second tube member of one of the two adjacent ones of the base units, and a blind flange connected to the tubular portion and closing the one end of the second tube member. The blind flanges abut against each other and are fastened by the fasteners.

7 Claims, 12 Drawing Sheets

(56) References Cited

U.S. PATENT DOCUMENTS

| | | | |
|---|---|---|---|
| 8,056,554 B2 * | 11/2011 | Hinderling | B63B 35/44 126/565 |
| 2008/0029148 A1 | 2/2008 | Thompson | |
| 2014/0174332 A1 | 6/2014 | Knight | |
| 2015/0214883 A1 | 7/2015 | Tung | |
| 2017/0040926 A1 * | 2/2017 | Smadja | H02S 30/10 |

FOREIGN PATENT DOCUMENTS

| | | | |
|---|---|---|---|
| EP | 2287544 A1 * | 2/2011 | |
| KR | 101218134 B1 | 1/2013 | |
| KR | 101270949 B1 | 6/2013 | |
| KR | 20150006520 | * | 1/2015 |
| TW | M408023 | 7/2011 | |

* cited by examiner

MODULAR SUPPORT ASSEMBLY FOR A SOLAR POWER SYSTEM

CROSS-REFERENCE TO RELATED APPLICATION

This application claims priority to Taiwanese Patent Application No. 104208348, filed on May 28, 2015.

FIELD

The disclosure relates to a modular support assembly, and more particularly to a modular support assembly for a solar power system.

BACKGROUND

Referring to FIG. 1, a conventional support device 1 for a solar power system, as disclosed in Taiwanese Utility Model Patent No. M408023, includes a base unit 11 floatable on a water surface, and a plurality of spaced-apart support units 12 mounted on the base unit 11. Each support unit 12 includes a connection base 121 detachably mounted on the base unit 11, and a plurality of spaced-apart support members 122 extending upwardly from the connection base 121. Two adjacent ones of the support members 122 cooperate with each other to position a solar panel 100.

Although the aforesaid conventional support device 1 can support a plurality of the solar panels 100 above the water surface, such as a sea water surface, a lake water surface or a water surface of fish farm, a single conventional support device 1 may have a limited photoelectrical conversion effect. Therefore, in actual practical use, a plurality of the conventional support devices 1 are simultaneously employed for enhancing the photoelectrical conversion efficiency.

When a plurality of the conventional support devices 1 are disposed on the water surface, because the conventional support device 1 does not include a connecting structure for connection with the other conventional support device 1, each time a conventional support device 1 is disposed on the water surface, a positioning operation has to be conducted. Hence, the arrangement of the conventional support devices 1 on the water surface is inconvenient.

Although a plurality of the conventional support devices 1 may first be connected to each other on a ground surface, it is difficult to pull the connected conventional support devices 1 to the water surface because the connected conventional support devices 1 is huge in size and weight.

A support assembly for mounting a solar panel unit, as disclosed in U.S. Patent Publication No. 2015/0214883A1, includes a base unit and a supporting unit. The base unit includes a plurality of base tubes that are spaced apart from each other and two connecting tubes that are respectively and detachably connected to the opposite end portions of each base tube. The supporting unit includes a plurality of limiting components and a plurality of supporting rods. Each limiting component permits at least two of the base tubes to extend therethrough so as to position the at least two of the base tubes relative to each other. Each supporting rod is detachably connected to and extends upwardly from a corresponding one of the limiting components and is adapted for supporting the solar panel unit thereon. However, the aforesaid support assembly may not be modularized because it does not include a connecting structure for connection of two adjacent ones of the base units.

SUMMARY

Therefore, an object of the disclosure is to provide a modular support assembly for a solar power system that can alleviate the drawbacks of the prior arts.

According to the disclosure, a modular support assembly includes a plurality of base units and a plurality of connection units.

Each of the base units includes a base frame capable of floating on a water surface and a plurality of solar panel supports disposed on the base frame. The base frame includes a first tube member extending in a first direction, and a second tube member extending in a second direction transverse to the first direction and connected to the first tube member.

Each of the connection units interconnects the base frames of two adjacent ones of the base units. Each connection unit includes a pair of sleeve members and a plurality of fasteners. Each of the sleeve members has a tubular portion sleeved on one end of the second tube member of the base frame of one of the two adjacent ones of the base units, and a blind flange connected to one end of the tubular portion and closing the one end of the second tube member. The blind flange has a plurality of annularly spaced-apart elongate holes. The blind flanges of the sleeve members abut against each other, the elongate holes of the blind flanges are aligned with each other for passage of the fasteners to fasten the blind flanges to each other, and the fasteners fasten together said blind flanges.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
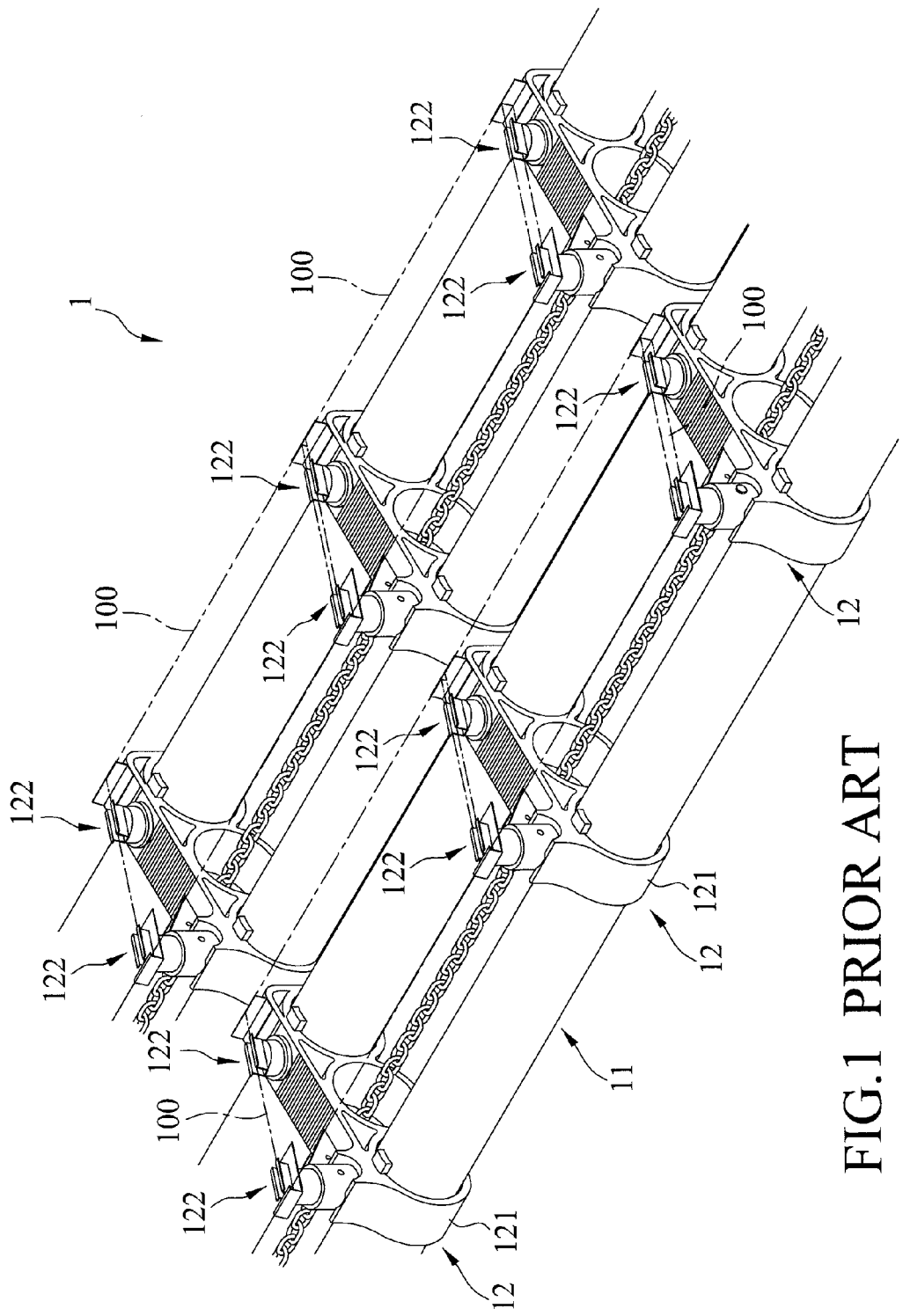
FIG. 1 is a fragmentary perspective view of a conventional support device disclosed in Taiwanese Utility Model Patent No. M408023.
Figure 2:
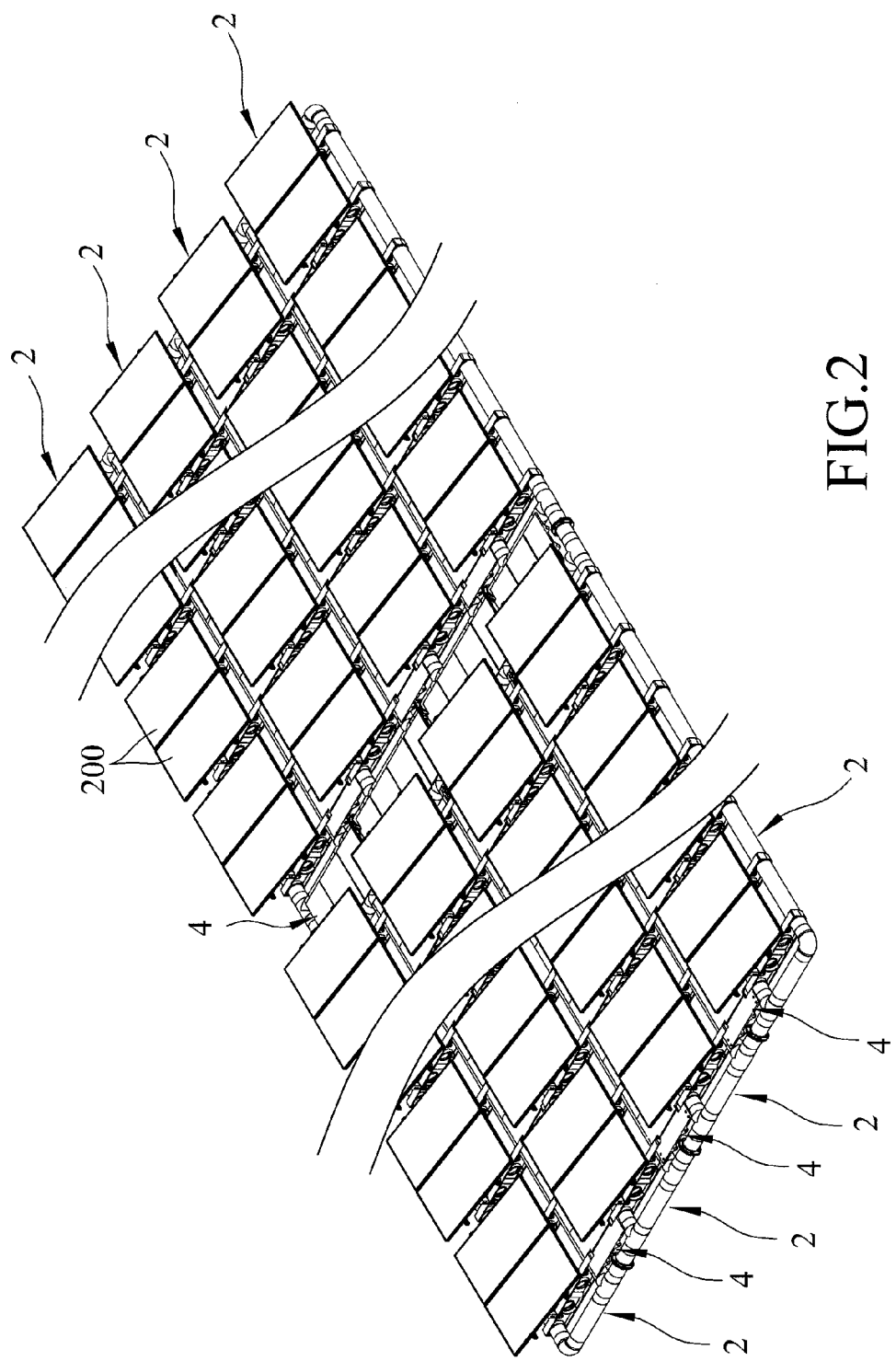
FIG. 2 is a fragmentary perspective view of a modular support assembly for a solar power system according to an embodiment of the present disclosure, illustrating the modular support assembly supporting a plurality of solar panels.
Figure 3:
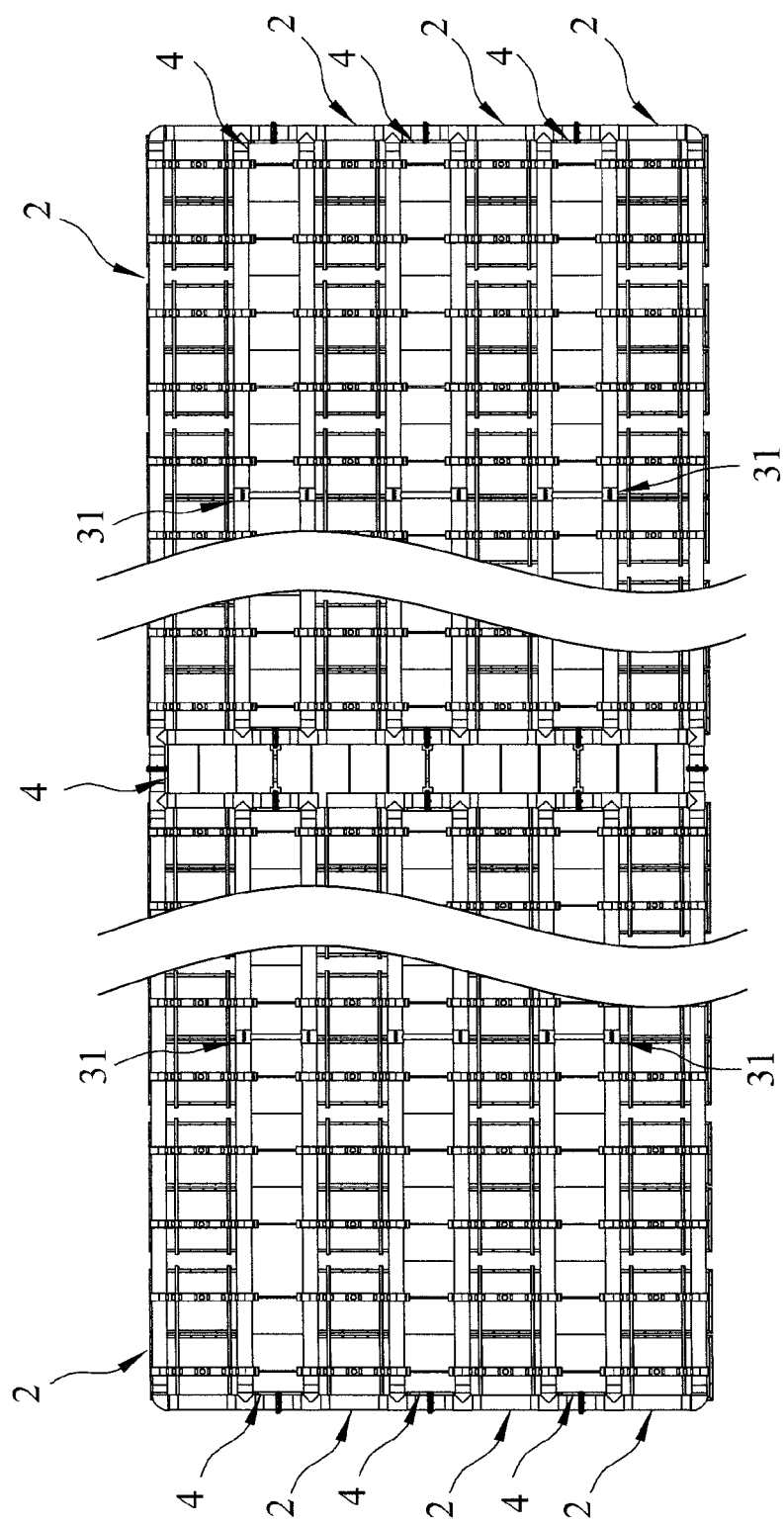
FIG. 3 is a fragmentary top view of the embodiment.

Referring to FIGS. 2 and 3, a modular support assembly for a solar power system according to an embodiment of the present disclosure includes a plurality of base units 2, a plurality of connection units 23, a plurality of auxiliary connectors 31 and a plurality of stepping devices 4.

Figure 4:
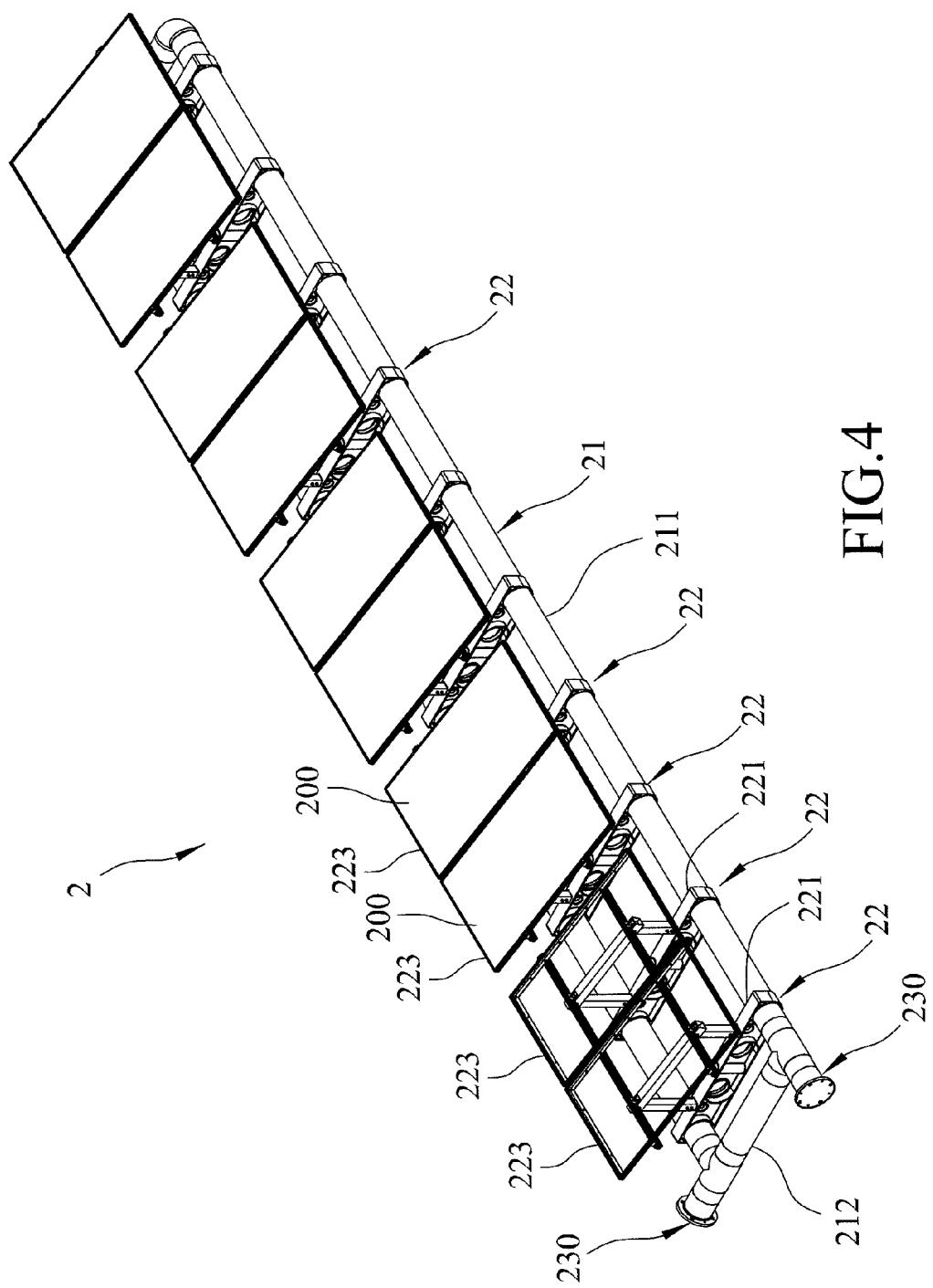
FIG. 4 is a perspective view of a base unit of the embodiment.
Figure 5:
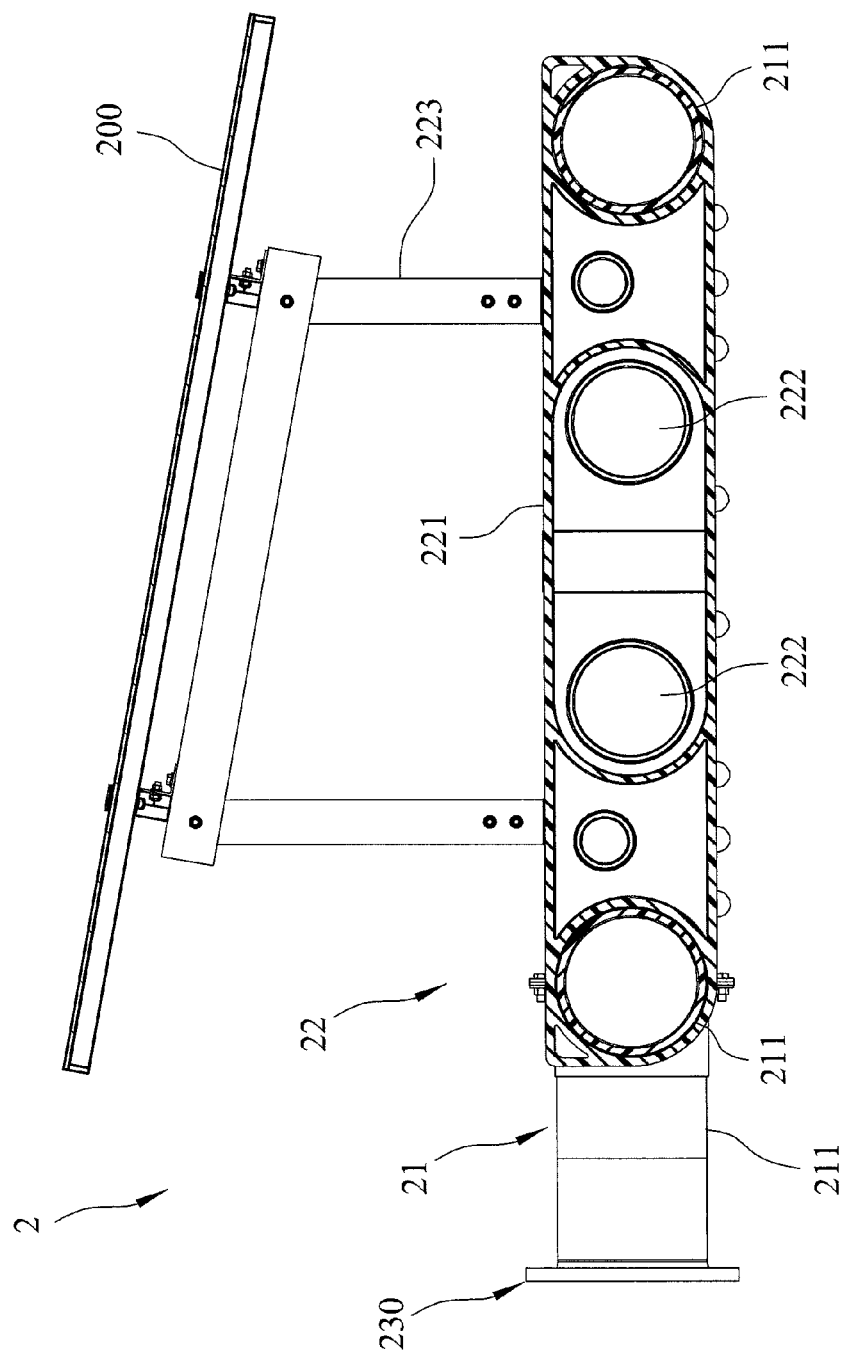
FIG. 5 is a partly sectional view of the embodiment, illustrating a solar panel support including a support base and a support frame disposed on the support base.
Figure 6:
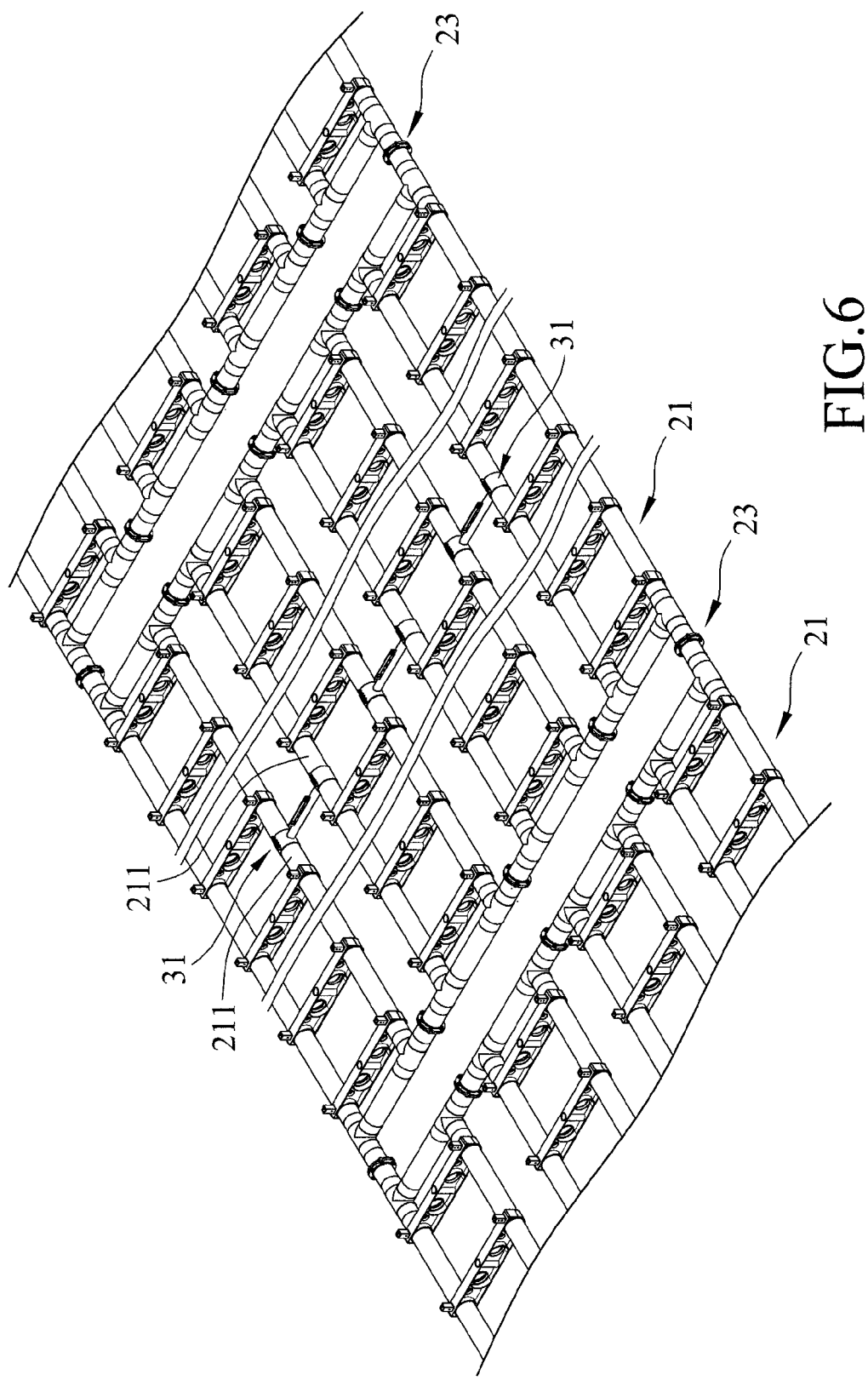
FIG. 6 is a fragmentary perspective view of the embodiment, illustrating each connection unit interconnecting base frames of two adjacent ones of the base units and each auxiliary connector interconnecting two first tube members of the base frames of the two adjacent ones of the base units.

Referring to FIGS. 4 to 6, each of the base units 2 includes abase frame 21 capable of floating on a water surface, and a plurality of spaced-apart solar panel supports 22 disposed on the base frame 21.

The base frame 21 of this embodiment includes two first tube members 211 extending in a first direction, and two second tube members 212 extending in a second direction transverse to the first direction and connected to the first tube members 211. The first tube members 211 are spaced apart from each other in the second direction, while the second tube members 212 are space apart from each other in the first direction.

Each solar panel support 22 includes a support base 221 disposed across the first tube members 211 and having two preformed holes 222, and a support frame 223 disposed on the support base 221 for supporting a solar panel 200. The preformed holes 222 are provided not only to allow flow of water therethrough, but also to reduce impact of water flow on the support base 221. When the entire weight of the base unit 2 is excessive, the preformed holes 222 can be used to increase the number of the first tube members 211 to increase buoyancy thereof. It should be noted that the number of the preformed holes 222 in the support base 221 is not limited to this disclosure and may vary as long as the same effect can be achieved. Two solar panels 200 in FIG. 4 are omitted to illustrate a connection relationship between the support base 221 and the support frame 223.

Figure 7:
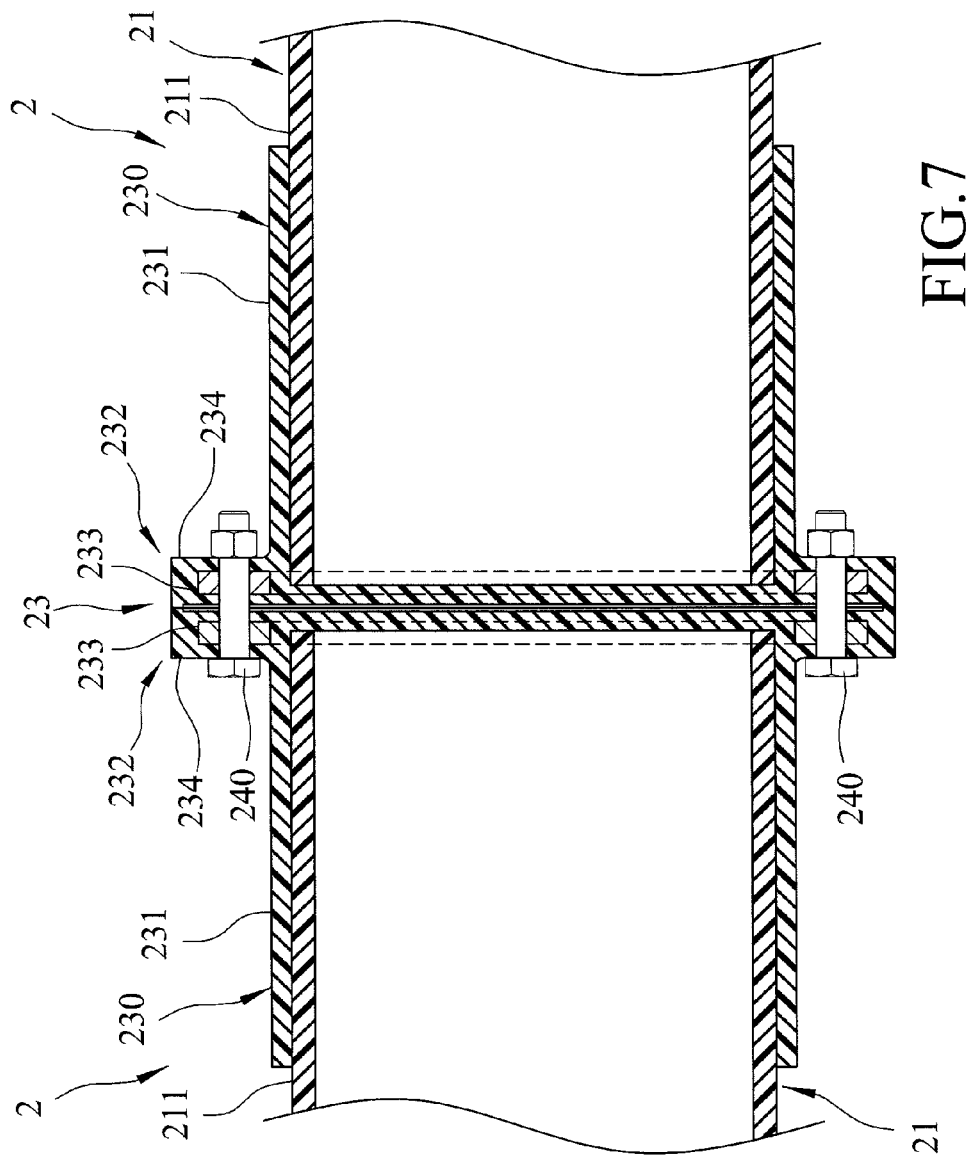
FIG. 7 is a fragmentary enlarged sectional view of the embodiment, illustrating the connection unit interconnecting the base frames of the two adjacent ones of the base units.
Figure 8:
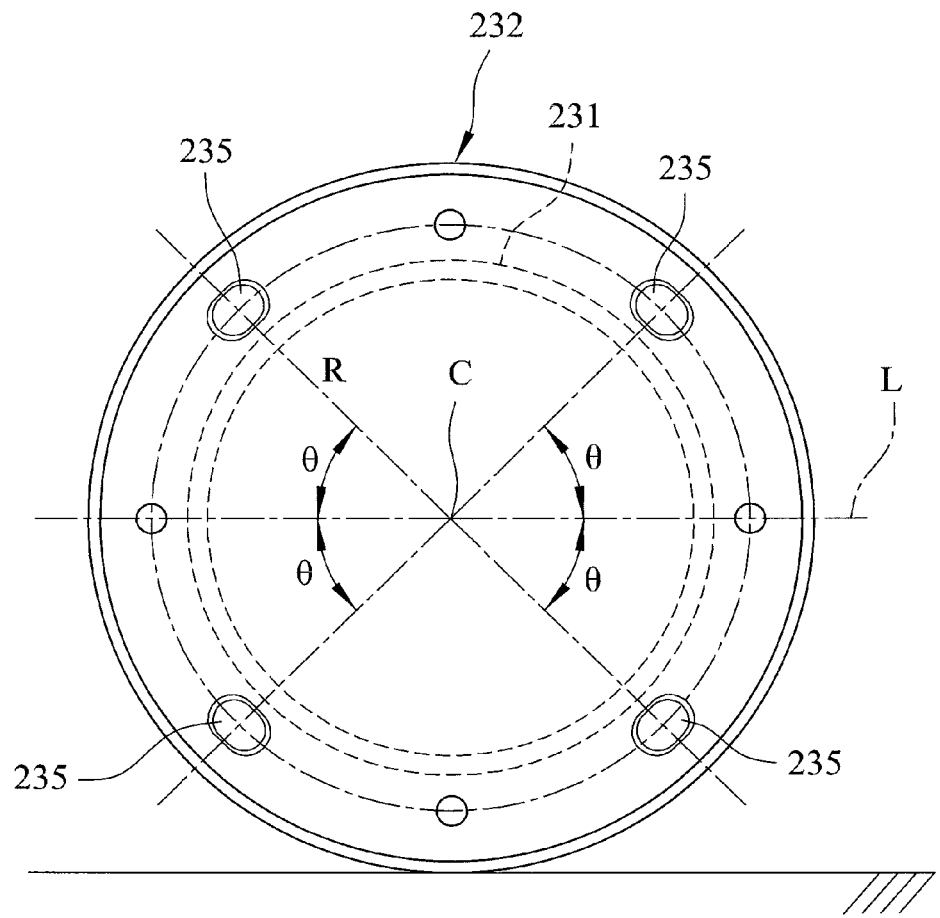
FIG. 8 is a side view of the embodiment, illustrating a blind flange having a plurality of annularly spaced-apart elongate holes.
Figure 9:
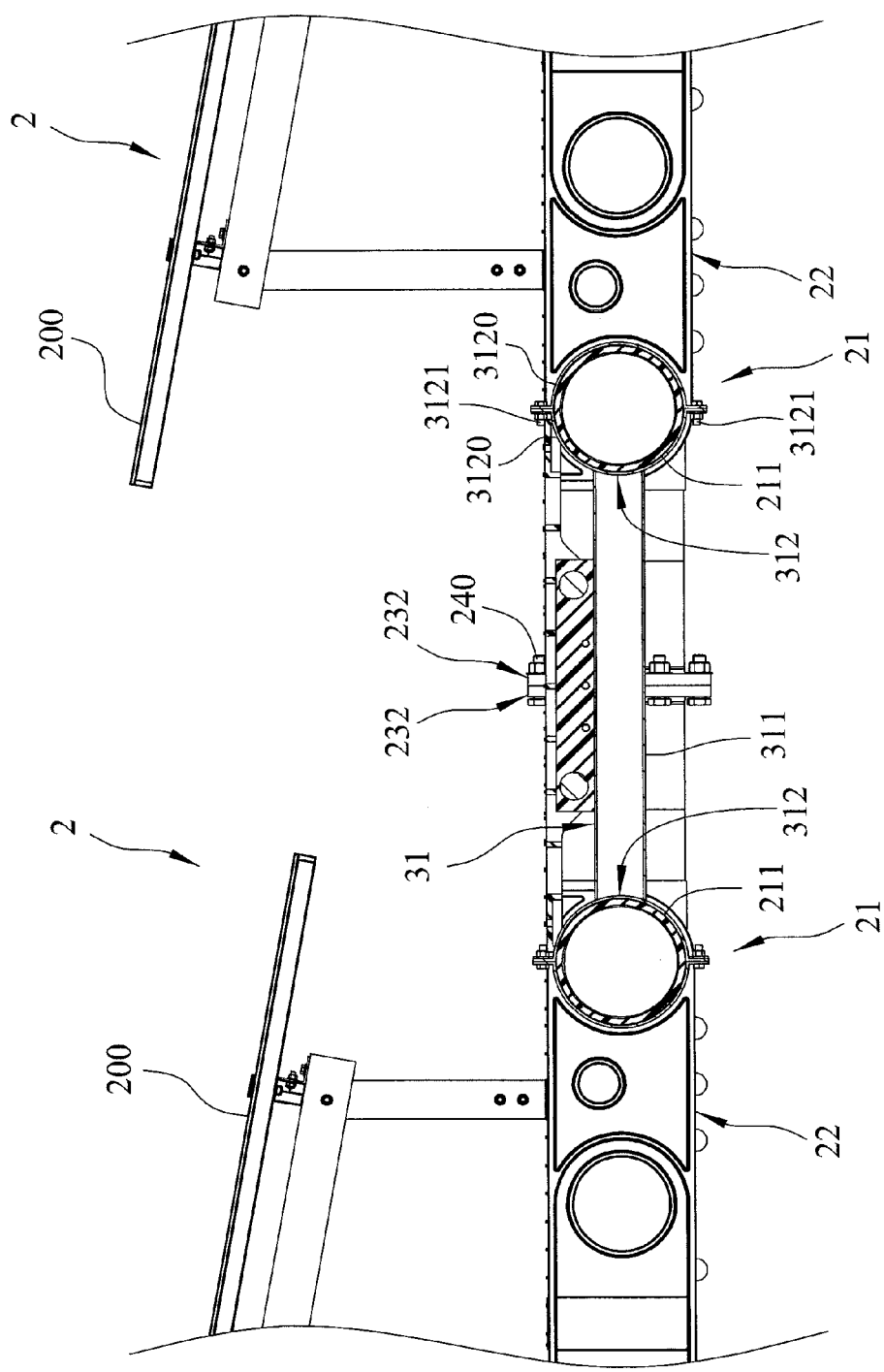
FIG. 9 is a partly sectional view of the embodiment, illustrating the auxiliary connector interconnecting the first tube members of the base frames of the two adjacent ones of the base units.
Figure 10:
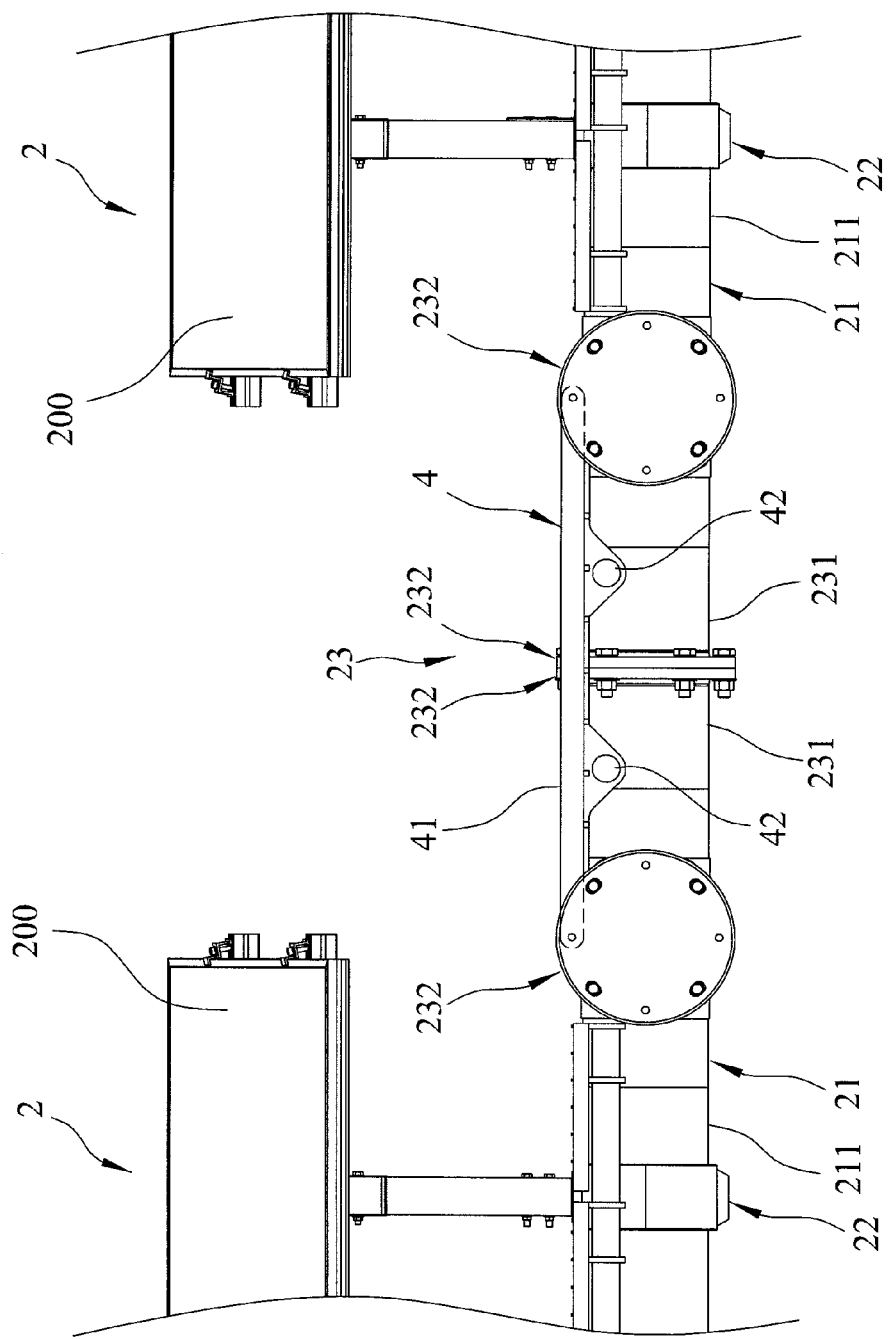
FIG. 10 is a fragmentary side view of the embodiment, illustrating a stepping device disposed between two adjacent ones of the base units.
Figure 11:
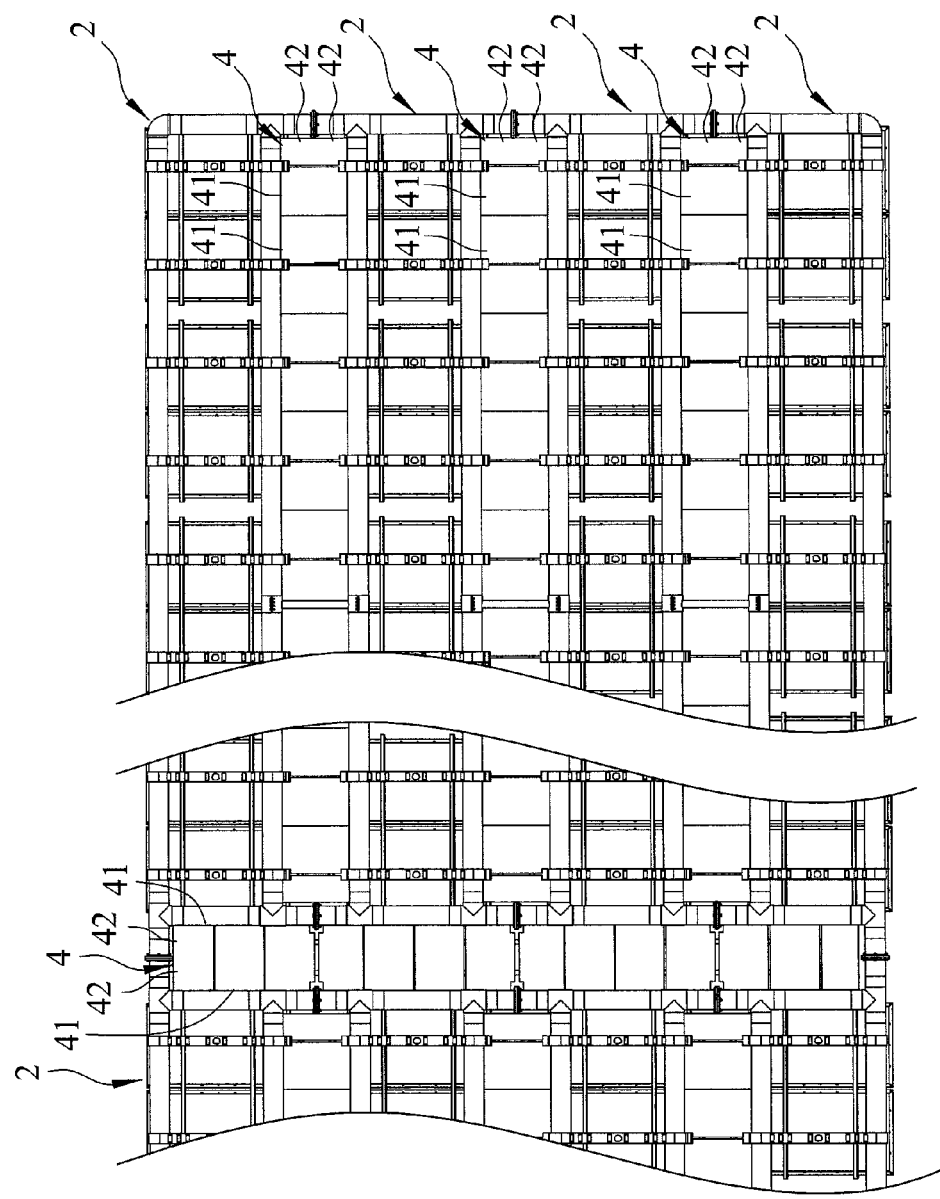
FIG. 11 is an enlarged top view similar to FIG. 3, but illustrating each stepping device having a plurality of stepping plates and a plurality of reinforcement rods.
Figure 12:
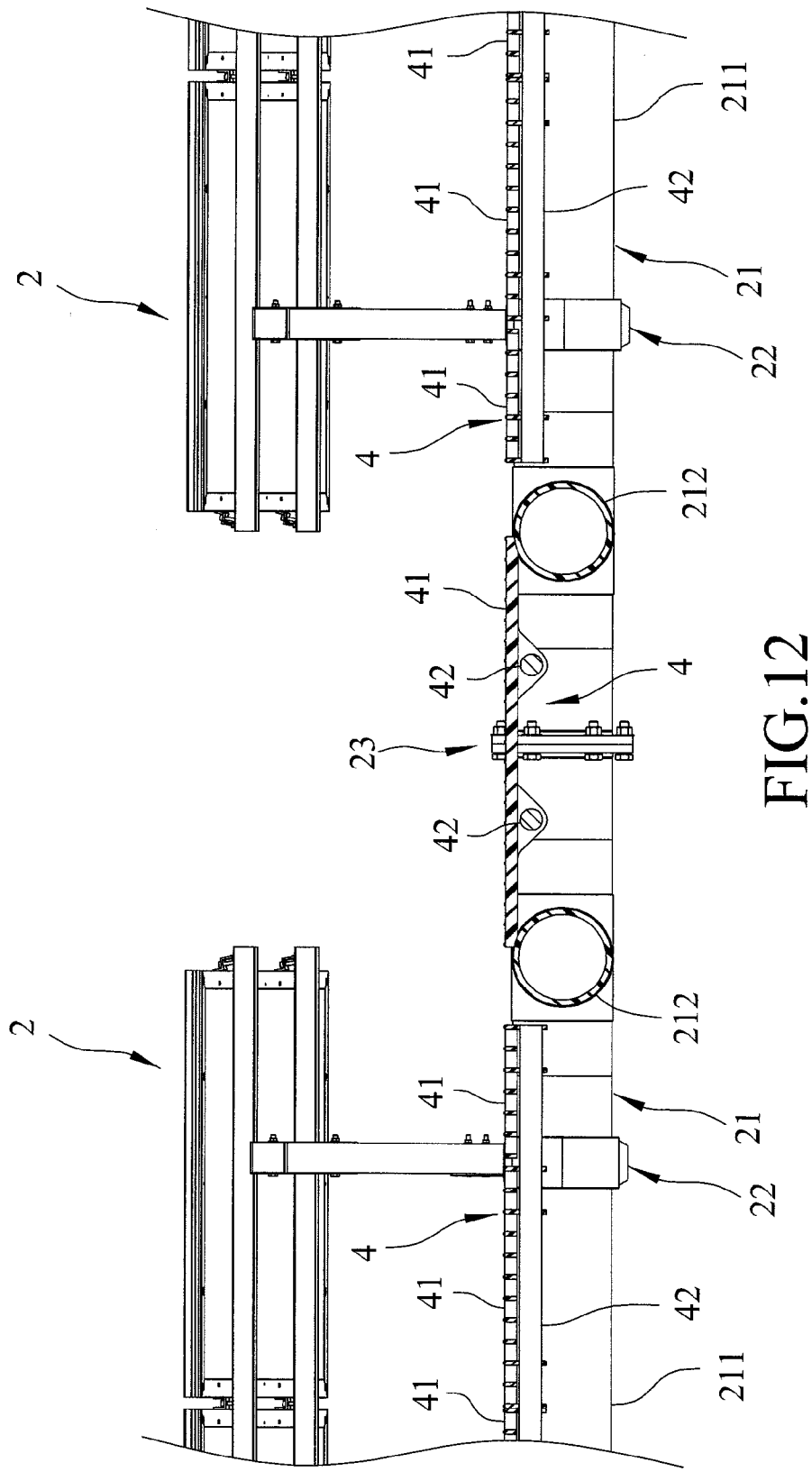
FIG. 12 is a sectional view of the embodiment, illustrating the stepping device disposed between the two adjacent ones of the base units.

Referring to FIGS. 7 and 8, in combination with FIGS. 4 to 6, each of the connection units 23 interconnects the base frames 21 of two adjacent ones of the base units 2, and includes a pair of sleeve members 230 and a plurality of fasteners 240. Each of the sleeve members 230 has a tubular portion 231 sleeved on and heat sealed to one end of a corresponding one of the first and second tube members 211, 212 of the base frame 21 of one of the two adjacent ones of the base units 2, and a blind flange 232 integrally connected to one end of the tubular portion 231 and closing the one end of the corresponding one of the first and second tube members 211, 212. In this embodiment, each of the tubular portion 231 and the blind flange 232 is made of a polymeric material. The blind flange 232 has a polymeric annular peripheral portion 234, and a plurality of annularly spaced-apart elongate holes 235 formed in the annular peripheral portion 234. Further, the blind flange 232 has a center (C) and a radial line (R) passing through the center (C) and two of the diametrically opposite elongate holes 235. Each sleeve member 230 further has an annular metal reinforcement piece 233 embedded in the annular peripheral portion 234. The elongate holes 235 extend through the annular peripheral portion 234 and the annular metal reinforcement piece 233. Each of the elongate holes 235 forms an included angle (θ) of less than 45° relative to a horizontal axial line (L) extending through the center (C).

To connect the base frames 21 of the two adjacent ones of the base units 2, the blind flanges 232 of the sleeve members 230 are moved to abut against each other, and the elongate holes 235 of the blind flanges 232 are brought to align with each other. The fasteners 240 are then passed through the respective elongate holes 235 to fasten together the blind flanges 232, thereby connecting the base frames 21 of the two adjacent ones of the base units 2 to each other.

By using the connection units 23, the base units 2 can be positioned and arranged in a matrix array on the water surface so as to form the modular support assembly of this disclosure, thereby effectively facilitating modularization and positioning operations of the modular support assembly of this disclosure on the water surface.

Further, because the metal reinforcement piece 233 can enhance the strength of the peripheral portion 234 of the blind flange 232, fastening stability of two fastened blind flanges 232 can be enhanced. Because each elongate hole 235 forms the included angle (θ) of less than 45° relative to the horizontal axial line (L), the elongate holes 235 are located in proximity to the water surface, thereby facilitating fastening operation of the two blind flanges 232 for connection of the base frames 21 of the two adjacent ones of the base units 2.

In comparison with a common circular hole, each elongate hole 235 has a larger positioning tolerance so as to conveniently fasten together the blind flanges 232.

Referring to FIGS. 9 to 12, in combination with FIGS. 3 and 6, the modular support assembly of this disclosure further includes a plurality of auxiliary connectors 31 and a plurality of stepping devices 4.

Each of the auxiliary connectors 31 has a connection bar 311, and two clamping rings 312 disposed on two opposite ends of the connection bar 311 and respectively clamping one of the first tube members 211 of the base frame 21 of one of the base units 2 and one of the first tube members 211 of the base frame 21 of an adjacent one of the base units 2. In this embodiment, each of the clamping rings 312 has two ring halves 3120, and two clamping screws 3121 fastening together the ring halves 3120 for clamping one of the first tube members 211. By virtue of the auxiliary connectors 31, a structural strength and stability of the two interconnected ones of the base units 2 can be increased.

Some of the stepping devices 4 are successively disposed along the first direction between each two adjacent ones of the base units 2, and the other ones of the stepping devices 4 are successively disposed along the second direction between another two adjacent ones of the base units 2. Each of the stepping devices 4 of this embodiment has a plurality of stepping plates 41 and two reinforcement rods 42 disposed beneath the stepping plates 41. The stepping plates 41 of each stepping device 4 which extends along the first direction are successively disposed between the first tube members 211 of the two adjacent ones of the base units 2. The stepping plates 41 of each stepping device 4 which extends along the second direction are successively disposed between the second tube members 212 of the another two adjacent ones of the base units 2. With the presence of the stepping plates 41 of the stepping devices 4, inspection and repair of the base units 2 can be facilitated. In addition, the reinforcement rods 42 can enhance the load and strength of the stepping plates 41.

To sum up, by virtue of each connection unit 23 interconnecting two adjacent ones of the base units 2, the base units 2 can be positioned and arranged in the matrix array on the water surface so as to form the modular support assembly of this disclosure. Therefore, the object of the disclosure can be realized.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A modular support assembly for a solar power system comprising:
    a plurality of base units each of which includes
        a base frame capable of floating on a water surface and including a first tube member extending in a first direction, and a second tube member extending in a second direction transverse to the first direction and connected to said first tube member, and
        a plurality of solar panel supports disposed on said base frame; and
    a plurality of connection units each of which interconnects said base frames of two adjacent ones of said base units, each of said connection units including a pair of sleeve members and a plurality of fasteners, each of said sleeve members having a tubular portion sleeved on one end of said second tube member of said base frame of one of said two adjacent ones of said base units, and a blind flange connected to one end of said tubular portion and closing said one end of said second tube member, said blind flange having a plurality of annularly spaced-apart elongate holes;
    wherein said blind flanges of said sleeve members abut against each other, said elongate holes of said blind flanges are aligned with each other for passage of said fasteners, and said fasteners fasten together said blind flanges.

2. The modular support assembly as claimed in claim 1, wherein said tubular portion is heat sealed to said one end of said second tube member of said base frame of said one of said two adjacent ones of said base units.

3. The modular support assembly as claimed in claim 1, wherein said blind flange has a center and a radial line passing through said center, and each of said elongate holes forms an included angle of less than 45° relative to a horizontal axial line extending through said center.

4. The modular support assembly as claimed in claim 1, wherein:
    each of said tubular portion and said blind flange is made of a polymeric material;
    said blind flange further has a polymeric annular peripheral portion; and
    each of said sleeve members further has an annular metal reinforcement piece embedded in said polymeric annular peripheral portion, said elongate holes extending through said annular peripheral portion and said polymeric annular metal reinforcement piece.

5. The modular support assembly as claimed in claim 1, further comprising a plurality of auxiliary connectors each of which has a connection bar and two clamping rings disposed on two opposite ends of said connection bar and clamping said first tube members of said two adjacent ones of said base units.

6. The modular support assembly as claimed in claim 4, further comprising a plurality of stepping devices each of which has a stepping plate disposed between two adjacent ones of said base units, and a reinforcement rod disposed beneath said stepping plate.

7. The modular support assembly as claimed in claim 5, wherein each of said clamping rings has two ring halves, and two clamping screws to fasten together said ring halves.

* * * * *